C. N. DENNETT.

CARRIAGE.

No. 6,869. Reissued Jan. 25, 1876.

Witnesses,
W. J. Cambridge
J. C. Cambridge

Inventor,
Charles N. Dennett
Per Teschemacher & Bearns
Attorneys.

N. PETERS, PHOTO-LITHOGRAPHER, WASHINGTON, D. C.

UNITED STATES PATENT OFFICE.

CHARLES N. DENNETT, OF SALISBURY, MASSACHUSETTS.

IMPROVEMENT IN CARRIAGES.

Specification forming part of Letters Patent No. 109,189, dated November 15, 1870; reissue No. 6,869, dated January 25, 1876; application filed November 18, 1875.

*To all whom it may concern:*

Be it known that I, CHARLES N. DENNETT, of Salisbury, in the county of Essex and State of Massachusetts, have invented certain Improvements in Carriages, of which the following is a full, clear, and exact description, reference being had to the accompanying drawings, making part of this specification, in which—

Figure 1:
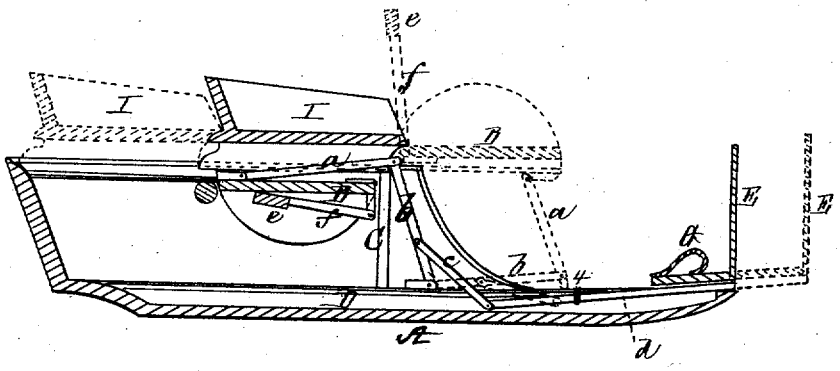
Figure 2:
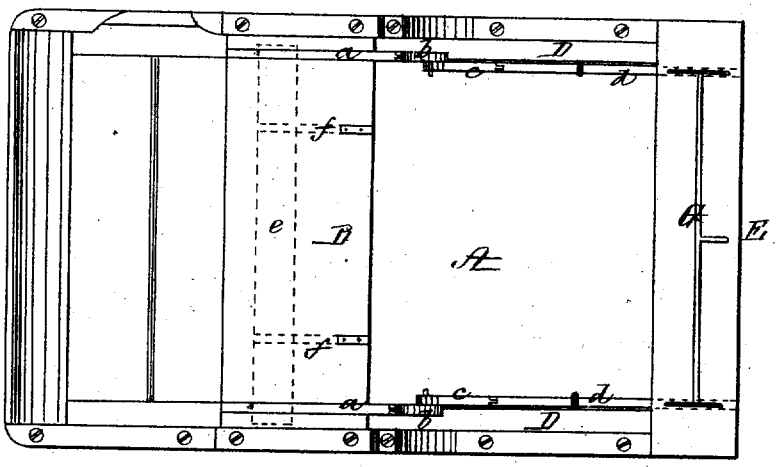

Figure 1 is a vertical longitudinal section through the center of the body of an open buggy constructed in accordance with my invention. Fig. 2 is a plan of the top of the same, the rear seat being removed.

My invention relates to that class of carriages which are desired to be used sometimes with one and sometimes with two seats, which may be applied to shifting, standing-top, and open buggies, four-post carriages, and sleighs, with equal facility; and my invention consists in a turn-out front seat, having its rear pivoted to standards rising from the sill or body, and having pivoted to each end of its front a pair of jointed rods or arms, which are swung forward to support the seat which may be thrown down out of the way to allow the back seat to be brought forward over it. And my invention also consists in other jointed rods, pivoted at their rear to the jointed seat-rods, and at their front to a dash-board and foot-rest, so as to form, when desired, an extension front for light carriages.

My invention also consists in a pivoted back of peculiar construction for the front seat.

To enable others skilled in the art to understand and use my invention I will proceed to describe the manner in which I have carried it out.

In the said drawings, A is the body of the carriage, the forward part of the sides of which are cut away in the ordinary manner.

B is the forward or turn-out seat, the rear of which is pivoted at or near each end to the top of a standard, C, rising from the sill D or body A.

At each end of the forward part of the under side of the seat B is pivoted one end of the rod *a*, the other end of which is pivoted to one end of a similar rod, *b*, the opposite extremity of the latter rod *b* being pivoted to the lower part or sill D of the body A, the point 4 of the union of the jointed rods being brought down to a bearing on the sill to form a support for the front of the forward seat when turned out ready for use. (See dotted lines, Fig. 1.)

The ends or arms of this seat B are made semicircular, or nearly so, and fit into corresponding recesses in the middle of the sides of the body or panels when said seat is turned back.

To each of the rods *b*, at a little distance above its lower end, is pivoted one end of the inclined rod *c*, the other end of which is pivoted to the rear end of a rod, *d*, which slides in guides secured to the sill or body of the carriage, to the forward end of which rod is attached one end of the dash-board E and foot-rest G, by which construction, when the seat B is turned out, they will be pushed forward, and when the said seat B is turned in the dash-board and foot-rest will be drawn back, thus extending the body of the carriage when two seats are to be used, and contracting it when only one seat is required.

The seat B is provided with a back, *e*, which is connected therewith by jointed arms *f*, (see Fig. 1,) so as to allow of the back being turned down on the seat out of the way when not required for use.

I is the rear seat, which rests and slides upon the upper edge of the sides of the body A, so as to be pushed back (as seen dotted) when two seats are to be used, and pushed forward over the turned-in seat B when one seat only is to be used.

What I claim as my invention, and desire to secure by Letters Patent, is—

1. The pivoted shifting or turn-out front seat B, connected by jointed rods or arms *a b* with the sill D or body A of a carriage, substantially as and for the purpose described.

2. I also claim the rods *a b c d*, connected and combined with the front seat B and dasher E, for the purpose set forth.

3. I also claim a movable back seat, I, and a shifting or turn-out front seat, B, combined with a sliding dasher, E, to admit of the adjustment of each to correspond to the contraction or elongation of the body, substantially as described.

4. I also claim a shifting or turn-out front seat, B, combined with a rest or back, *e f*, jointed and folding as described, for the purpose set forth.

Witness my hand this 15th day of November, A. D. 1875.

CHARLES N. DENNETT.

In presence of—

N. W. STEARNS,

P. E. TESCHEMACHER.